(12) United States Patent
Agretti et al.

(10) Patent No.: US 8,364,143 B2
(45) Date of Patent: Jan. 29, 2013

(54) DETECTION OF ANTI-STEERING OF ROAMING ACTIVITY ON VISITED NETWORKS

(75) Inventors: Paolo Norberto Agretti, Padua (IT);
Daniel Paul Russo, Dallas, TX (US);
Sameh M Yamany, Plano, TX (US)

(73) Assignee: Tektronix, Inc., Beaverton, OR (US)

( * ) Notice: Subject to any disclaimer, the term of this patent is extended or adjusted under 35 U.S.C. 154(b) by 47 days.

(21) Appl. No.: 12/975,137

(22) Filed: Dec. 21, 2010

(65) Prior Publication Data
US 2012/0157092 A1    Jun. 21, 2012

(51) Int. Cl.
*H04W 4/02* (2009.01)
(52) U.S. Cl. .................................. 455/432.1
(58) Field of Classification Search .... 455/432.1–432.3, 455/433, 435.1, 445, 413, 558, 551, 552.1, 455/415, 436, 439, 449, 438, 437, 440, 441, 455/442, 443; 370/354, 494, 493
See application file for complete search history.

(56) References Cited

U.S. PATENT DOCUMENTS

| | | | | |
|---|---|---|---|---|
| 5,353,328 A * | 10/1994 | Jokimies | ...................... | 455/558 |
| 5,586,166 A * | 12/1996 | Turban | ........................... | 455/558 |
| 5,742,910 A * | 4/1998 | Gallant et al. | ................ | 455/558 |
| 5,764,730 A * | 6/1998 | Rabe et al. | ..................... | 455/403 |
| 5,930,701 A * | 7/1999 | Skog | ............................. | 455/415 |
| 5,940,490 A * | 8/1999 | Foster et al. | ............. | 379/211.02 |
| 7,133,670 B1 * | 11/2006 | Moll et al. | ................. | 455/432.1 |
| 7,369,848 B2 * | 5/2008 | Jiang | ........................... | 455/432.3 |
| 7,496,090 B2 * | 2/2009 | Jiang | ............................. | 370/354 |
| 7,505,769 B2 * | 3/2009 | Jiang | ........................... | 455/432.3 |
| 7,873,358 B2 * | 1/2011 | Jiang | ........................... | 455/435.1 |
| 7,907,597 B2 * | 3/2011 | Lee et al. | ...................... | 370/352 |
| 7,912,464 B2 * | 3/2011 | Jiang | ........................... | 455/432.1 |
| 7,941,143 B2 * | 5/2011 | Dorenbosch | ............... | 455/435.1 |
| 8,150,392 B1 * | 4/2012 | McConnell et al. | ....... | 455/432.1 |
| 8,200,216 B2 * | 6/2012 | Noldus | ........................ | 455/433 |
| 8,204,502 B2 * | 6/2012 | Khetawat et al. | ............. | 455/436 |
| 8,229,393 B2 * | 7/2012 | Chan et al. | ................... | 455/406 |
| 8,254,912 B2 * | 8/2012 | Silver | ......................... | 455/426.1 |
| 8,254,918 B2 * | 8/2012 | Jiang | ........................... | 455/432.1 |
| 8,260,267 B2 * | 9/2012 | Han | ........................... | 455/414.1 |

* cited by examiner

*Primary Examiner* — Melody Mehrpour
(74) *Attorney, Agent, or Firm* — Fogarty, L.L.C.

(57) ABSTRACT

A system and method for automatically detecting Anti-Steering of Roaming activity is disclosed. This method can be used by a monitoring system on a home network that continuously monitors all international MAP signaling with a visited network. Anti-Steering of Roaming is detected by estimating a number of roaming subscribers of different types, including a number of unique active roamers, a number of unique steered roamers, and a number of unique anti-steered roamers. The numbers of subscribers of the different types, either alone or in combination, are compared to threshold values. If the numbers exceed the threshold value, then the monitoring system alerts the home network that a visited network may be using Anti-Steering of Roaming technology.

24 Claims, 2 Drawing Sheets

DETECTION OF ANTI-STEERING OF ROAMING ACTIVITY ON VISITED NETWORKS

TECHNICAL FIELD

Embodiments are directed, in general, to monitoring signaling between home and visited public mobile networks and, more specifically, to determining if a visited network is rejecting steering of roaming by the home network.

BACKGROUND

A mobile service provider typically provides wireless coverage in a designated geographical area, such as a particular country or one or more Metropolitan Service Area (MSA). When the service provider's subscribers require mobile service within these areas, the subscribers' mobile phone or user equipment searches for and attaches to the service provider's network. When a subscriber travels outside the service provider's designated coverage area, the subscriber's mobile phone is considered to be roaming and must attach to another service provider's mobile network—a visited network—to obtain service. The visited network exchanges information with the home network when the subscriber attaches to verify that the subscriber's mobile phone is a valid device. If an authentication message exchange is successful, the roaming subscriber obtains service from the visited network.

For example, a subscriber of a U.S.-based mobile network may travel to Europe. To obtain mobile service while in Europe, the U.S.-based subscriber's mobile phone must look for and attempt to attach to a European service provider's mobile network. The roaming mobile device may detect multiple potential visited networks. Typically, the mobile device will attach to the visited network having the strongest signal.

Often, a home mobile service provider will enter into contractual agreements with preferred foreign service providers that provide coverage in areas outside the home service area. Such contracts may provide, for example, lower billing rates and/or a guaranteed class of service for roaming subscribers from the home network. Accordingly, the home network service provider usually wants its subscribers' roaming mobile devices attach to a preferred foreign service provider. To accomplish this, the home network uses Steering of Roaming (SoR) in an attempt to guide its subscribers' mobile devices to the preferred visited networks. In order to maintain the roaming subscriber on its network, or to prevent the roaming subscriber's from using another visited network, some non-preferred visited networks employ Anti-Steering of Roaming (Anti-SoR) techniques.

SUMMARY

A monitoring system analyzes signaling traffic between a visited public mobile network and a home public mobile network to determine if the visited network is using anti-steering of roaming techniques against the home network's subscribers. The monitoring system may detect, for example, whether the visited network is emulating a manual detach by the subscriber or is not responding to detach messages from the home network.

In one embodiment, a monitoring system detects anti-steering of roaming on a visited network. The monitoring system captures signaling messages received at a home network from a visited network. The signaling messages correspond to attempts by roaming home network subscribers to attach to the visited network. The monitoring system estimates a number of active roaming subscribers, a number of steered roaming subscribers, and a number of anti-steered roaming subscribers on the visited network. The monitoring system then compare the estimated numbers of active roaming subscribers, steered roaming subscribers, and anti-steered roaming subscribers alone or in combination to one or more preselected thresholds. If one or more of the estimated numbers, either alone or in combination with other estimated numbers, exceed a preselected threshold, then the monitoring system identifies potential anti-steering of roaming activity.

BRIEF DESCRIPTION OF THE DRAWINGS

Figure 1:
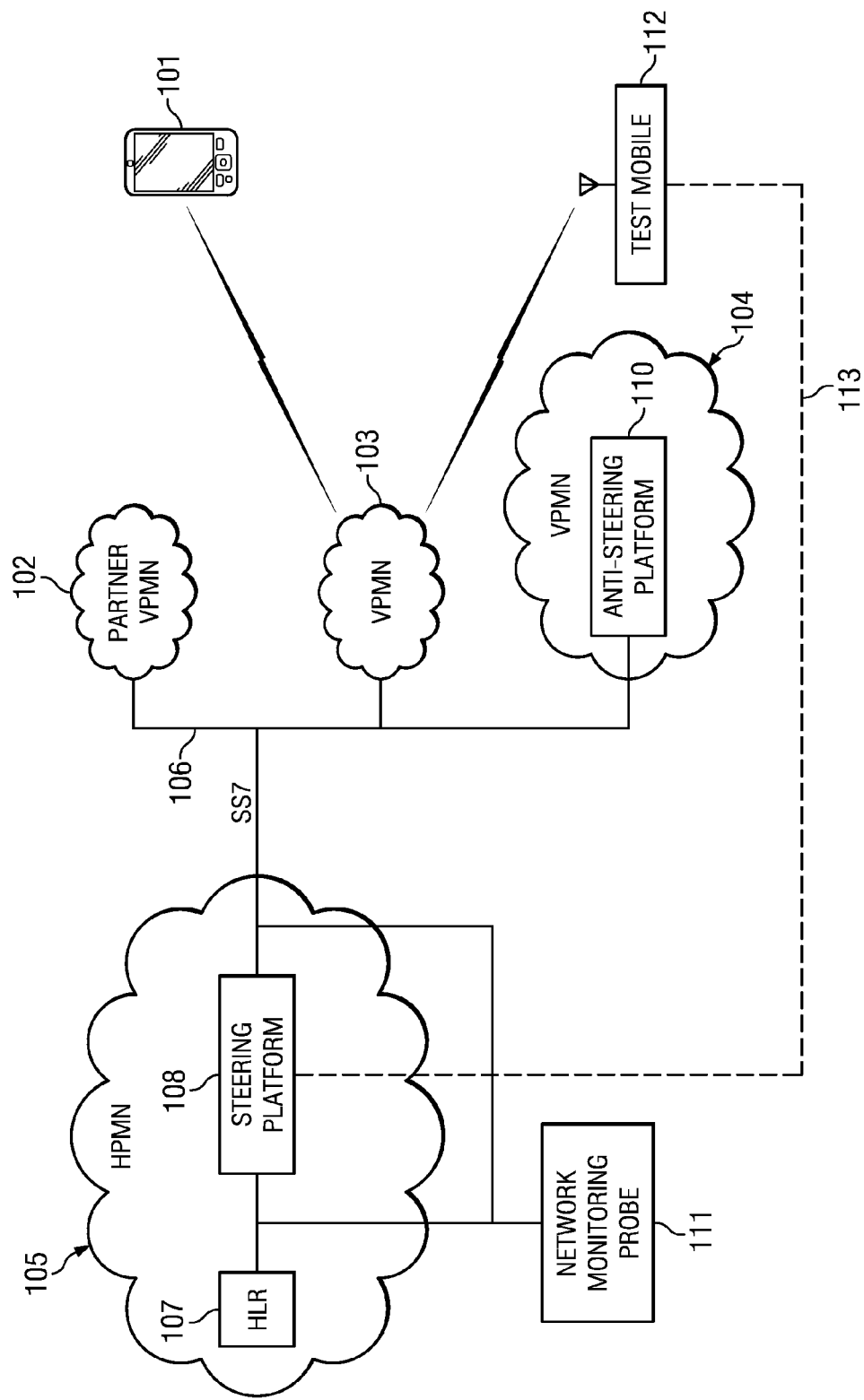
Figure 2:
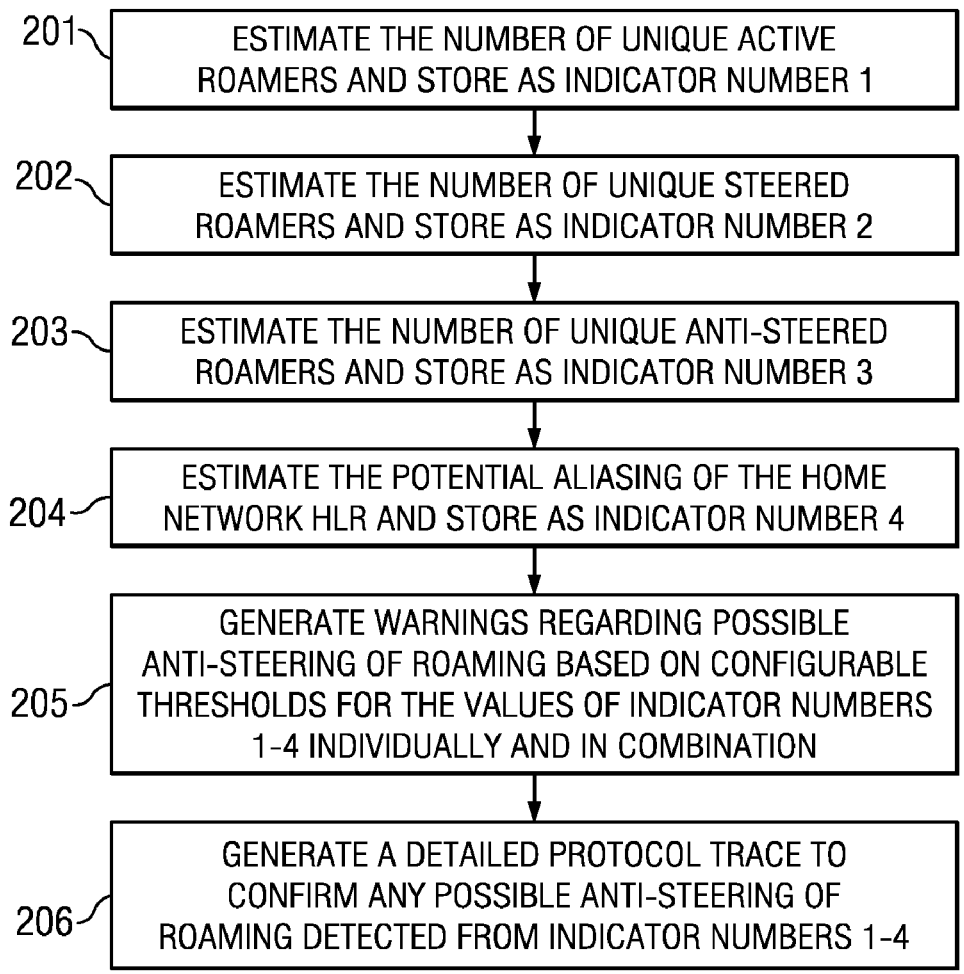

Having thus described the invention in general terms, reference will now be made to the accompanying drawings, wherein:

FIG. 1 is a high level block diagram illustrating the interaction of User Equipment (UE) with Visited Public Mobile Networks (VPMN); and FIG. 2 is a flowchart illustrating a process for detecting Anti-Steering of Roaming activity according to one embodiment of the invention.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 is a high level block diagram illustrating the interaction of User Equipment (UE) 101 with Visited Public Mobile Networks (VPMN) 102-104. UE 101 is a subscriber of Home Public Mobile Network (HPMN) 105, which provides wireless services to UE 101 when the device is operating in its home area, region or country. When HPMN 105 does not provide wireless services when subscribers, such as UE 101, are roaming or have traveled to a different area, region or country. In that situation, the subscriber must search for other public mobile networks and will attempt to access another network to obtain wireless service. For example, UE 101 may detect three VPMNs 102-104 while searching for a roaming provider. UE 101 will typically measure the signal strength of VPMNs 102-104 and will attempt to connect to the VPMN that has the strongest signal. If UE 101 attaches to one of the VPMNs, then HPMN 105 will receive authentication messages from that VPMN during the registration process for UE 101. The attachment and authentication messages from the VPMN will notify HPMN 105 that UE 101 is roaming and has attached to a particular VPMN.

HPMN 105 may have one or more preferred VPMNs in areas outside the HPMNs service area. For example, HPMN 105 may partner with VPMN 102 to support HPMN 105's roaming subscribers. VPMN 102 may provide preferred billing rates or enhanced services to the roaming subscribers of HPMN 105. As a result, HPMN 105 would prefer that subscribers, including UE 101, use VPMN 102 while roaming in the VPMNs service area. If UE 101 attaches to VPMN 102, then HPMN 105 will receive authentication messages from VPMN 102 during the registration process for UE 101. HPMN 105 will determine that UE 101 has attached to a partner or preferred VMPN 102, and HPMN 105 will provide authentication data to allow UE 101 to register with VPMN 102.

UE 101 may determine that VPMN 103 has the strongest signal and may attempt to attach to VPMN 103. HPMN 105 will receive authentication messages from VPMN 103 during the registration process for UE 101. HPMN 105 will determine that UE 101 has attached to a non-preferred or unknown VMPN. HPMN 105 will also determine that partner VPMN 102 could serve UE 101 in the same area as VPMN 103. HPMN 105 may then command UE 101 to detach from VMPN 103 and to look for another VMPN or to reattach to Partner VMPN 102 specifically.

The process wherein HPMN 105 directs or attempts to direct UE 101 to attach to a specific VPMN is referred to as Steering of Roaming (SoR). Steering of Roaming is a technology employed by the Home network, such as HPMN 105, to manage outbound roaming traffic for subscribers, such as UE 101, in order to control the percentage of roaming traffic that is exchanged with preferred or partner networks (preferred VPMN). Typically, Steering of Roaming applies to subscribers that have traveled to a different country that the Home network does not service. Steering of Roaming may be accomplished in several different ways, including, for example, over-the-air (OTA) steering and SS7-node-based redirection.

In OTA steering, UE 101 maintains a list of preferred networks assigned by the HPMN 105. The UE 101 attempts to connect to one of the preferred networks, such as VPMN 102, when roaming away from the HPMN 105. The preferred network list can be updated by the HPMN 105, such as by sending a GSM MAP message: MT FSM 63-(U)SIM Data download to the UE 101.

In SS7-node-based redirection, when the UE 101 attaches to another network, such as a VPMN 103 in a visited country, a Mobile Application Part (MAP) Update Location message is sent over an SS7 network 106 from VPMN 103 to the Home Location Register (HLR) 107 on the Home network 105 for UE 101. A steering platform 108 located in Home network 105 and intercepts the Update Location message and identifies the VPMN 103 from which the message originated. If VPMN 103 is not preferred or partner network for HPMN 105, then the Home network may desire to steer roaming subscribers away from that network. The steering platform 108 will reject the Update Location message. The failed Location Update procedure will force UE 101 to detach from VPMN 103 and to attempt to attach to the next available network. UE 101 will again search for available networks and will attempt to attach to the network with the next strongest signal after VPMN 103. HPMN 105 and steering platform 108 will continue to reject Update Location messages for UE 101 until the message comes from a preferred VPMN 102.

Different response codes may be sent in the Reply to the MAP Update Location message. Those messages may also be used by steering platform 108 to redirect UE 101 to a different VPMN. Steering platform 108 may use certain Response Codes to reject the Update Location messages and to steer the roaming subscribers to other VPMNs. In networks using the 3GPP GSM MAP specification, for example, the values that are allowed for responding to the Update Location messages are System Failure, Roaming Not Allowed, Data Missing, and Unexpected Data Value.

When UE 101 attaches to certain roaming providers, such as VPMN 104, the Visited network may attempt to counter any Steering of Roaming that is being implemented by the Home network 105. The process by which Steering of Roaming is countered or rejected is referred to as Anti-Steering of Roaming (Anti-SoR).

Anti-Steering of Roaming is used by non-preferred VPMNs to override Steering of Roaming from the HPMN. The non-preferred VPMN 104 may desire, for example, to retain the roaming subscriber's identity in order to capture the roaming traffic and the corresponding revenues. Alternatively, the non-preferred VPMN 104 may attempt to prevent or minimize revenues from being generated on a competitor's network, such as preferred VPMN 102.

Visited networks use different types of Anti-Steering of Roaming to counter the different types of Steering of Roaming. In order to override the SS7-node-based redirection mechanism, for example, the Anti-SoR methods rely on SS7 signaling and fall into two main categories: forced manual mode or periodic recapture. In forced manual mode, the VPMN Anti-SoR platform generates consecutive Update Locations to the HPMN until the SoR platform stops rejecting the Update Location messages. After a certain number of Update Locations are received, the HPMN SoR platform assumes that the subscriber is trying to manually select a specific network. In periodic recapture, when a non-preferred VPMN receives a MAP Cancel Location from the HPMN, the Anti-SoR platform on the VPMN issues a MAP Update Location. The Cancel Location-Update Location pattern repeats in a semi-continuous sequence and the UE is never (with the exception of very short time windows) able to perform any mobile terminating or mobile originating service. In some situations, other signaling may also be supported by the VPMN to reduce the risk of service disruption for the roaming subscriber. These methods may be used alone or in combination by a non-preferred VPMN to counter steering of roaming activities on the Home network. In one embodiment, the non-preferred VPMN 104 has an anti-steering of roaming platform 110 that monitors SS7 traffic between VMPN 104 and HPMN 105.

The subscriber using UE 101 may desire to use a particular VPMN while roaming. To provide this option to the subscriber, HPMN 105 may allow UE 101 to operate in a manual mode in which the subscriber manually chooses which Visited network to use. Anti-Steering of Roaming platform 110 may take advantage of this capability of UE 101. Anti-SoR platform 110 operates in the forced manual node by generating consecutive Update Location messages and sending them to HPMN 105 as if they were initiated by UE 101. Steering of Roaming platform 108 will initially reject the Update Location messages because they are originating from a non-preferred Visited network. However, Steering of Roaming 108 will eventually stop rejecting the Update Location messages on the assumption the subscriber is trying to manually select a specific network. For example, 3GPP TS 24.008 specifies that after four Update Location messages are received at fifteen seconds intervals, then the HPMN should stop rejecting the Update Locations. In this manner, without the subscriber's knowledge, VMPN 104 may successfully mimic messages from UE 101 and prevent HPMN from redirecting UE 101 to a preferred VPMN, such as partner VPMN 102. As a result, the subscriber may be subject to higher rates or substandard service on non-preferred VPMN 104 than what is available on a preferred Visited network.

The non-preferred VPMN may not care whether the subscriber successfully attaches to its network as long as the roaming subscriber is also prevented from attaching to a competitor's network. Anti-Steering of Roaming platform 110 uses periodic recapture to keep UE 101 from attaching to other Visited networks. When UE 101 attempts to attach to VPMN 104, an Update Location message is sent to HPMN 105 as discussed above. Because VPMN 104 is not a preferred VPMN, the SoR platform 108 will send a Cancel Location or other MAP message to VPMN 104 in an attempt to force UE 101 to attach to another Visited network. When non-preferred VPMN 104 receives the Cancel Location message from HPMN 105, Anti-SoR platform 110 again issues another MAP Update Location to HPMN 105. SoR platform 108 will again issue a Cancel Location message. The Update Location/Cancel Location pattern is repeated by Anti-SoR platform 110 in a continuous or semi-continuous sequence. As a result, UE 101 is never able to achieve any mobile-terminating or mobile-originating service. At best, the UE 101 may have service for very short time windows in between the Update Location/Cancel Location exchanges from the Anti-SoR and SoR platforms.

Anti-Steering of Roaming attacks, such as those described above, may be detected using an SS7 monitoring system. In one embodiment, a HPMN that is equipped with a passive monitoring system continuously monitors all international MAP signaling. By analyzing the MAP signaling, the monitoring system can automatically detect Anti-SoR activity on a Visited network.

The passive monitoring system may comprise of one or more network monitoring probes 111. As illustrated in FIG. 1, the probe 111 may be coupled to one or more interfaces or interconnect links on the Home network 105. It will be understood that probe 111 may also be coupled to any interfaces or interconnect links within Home network 105 in addition to the links from steering platform 108 to HLR 107 and VPMNs 102-104. For purposes of simplification, FIG. 1 does not illustrate all possible monitored links in network 105. Probe 111 passively captures message traffic from the interfaces without interrupting the network's operation.

Monitoring probe 111 as illustrated in FIG. 1 is representative of one or more monitoring probes on Home network 105. Each monitoring probe may capture traffic from one or more links on the network. In addition, traffic on certain links may be captured by more than one probe 111. If multiple probes 111 are used, the probes may be interconnected to share and exchange captured traffic. The monitoring system may use a distributed architecture optimized to handle high volume signaling traffic. The monitoring system and probe 111 may provide real-time, multi-protocol tracking of every transaction across a network, enabling bearer/service subscriber, link/interface, and node status monitoring. In one embodiment, probe 111 may be part of the GeoProbe platform, including the Iris Analyzer Toolset applications and SpIprobes and G10 probes, from Tektronix Incorporated. The monitoring probe may comprise a processor running software applications for analyzing data traffic captured from the SS7 links and a memory for storing software application instructions and captured data traffic. It will be understood that other network monitoring devices or probes may also be used to detect Anti-Steering of Roaming using the techniques disclosed and described herein.

FIG. 2 is a flowchart illustrating a process for detecting Anti-Steering of Roaming activity according to one embodiment of the invention. A monitoring system capturing data from links in a Home network may run the process shown in FIG. 2 to detect when a Visited network is applying Anti-Steering of Roaming techniques against the Home network's subscribers. In step 201, the monitoring system estimates a first parameter, designated in one embodiment as "Indicator No. 1," which corresponds to the number of unique Active Roamers. Indicator No. 1 is an estimate of how many of the Home network's subscribers are roaming on a Visited network over a given period.

In step 202, the monitoring system estimates a second parameter, designated as "Indicator No. 2" in one embodiment, which corresponds to the number of unique Steered Roamers. Indicator No. 2 is an estimate of how many of the Home network's subscribers are associated with signaling traffic that indicates steering of roaming activity initiated by the Home network over a given period. In step 203, the monitoring system estimates a third parameter, designated as "Indicator No. 3" in one embodiment, which corresponds to the number of unique Anti-Steered Roamers. Indicator No. 3 is an estimate of how many of the Home network's subscribers are associated with signaling that indicates anti-steering of roaming activity initiated by a Visited network over a given period.

In step 204, the monitoring system estimates a fourth parameter, designated as "Indicator No. 4" in one embodiment, which corresponds to the potential aliasing of the Home network's HLR. Indicator No. 4 is an estimate the amount of signaling traffic that indicates that an anti-steering platform on a Visited network is using the address of the Home network's HLR when responding to traffic from the Visited network.

The Indicator No. 1-4 parameters may be associated with a specific Visited network or a group of Visited networks. The Indicator Nos. 1-4 parameters may correspond to activity detected over a specific period, such as a selected period of minutes, hours, days, or any other time.

In step 205, the monitoring system generates warnings regarding possible anti-steering of roaming activity. The Anti-SoR warnings are determined based on comparisons of the Indicator No. 1-4 parameter values to configurable thresholds. A user, such as the Home network service provider, may establish or select thresholds for each of the Indicator No. 1-4 parameters. The thresholds may be generic and applied to all Visited networks, or selected specifically for one or more particular Visited networks. The values of the individual Indicators and/or various combinations of two or more of the Indicators may be used to identify potential Anti-SoR activity.

In step 206, the monitoring system generates a detailed protocol trace to confirm any detected possible Anti-Steering of Roaming activity on a specific Visited network.

It will be understood that steps 201-204 of the process may be executed simultaneously and/or sequentially. It will be further understood that the steps may be performed in any order and may be performed once or repetitiously. The process in FIG. 2 may be performed continuously depending upon the processing capabilities and resources available on monitoring system. Continuous and simultaneous monitoring of the Indicators would allow the monitoring system to generate near real-time warnings of Anti-SoR activity.

Alternatively, traffic traces between a Home network and Visited networks may be captured over time. At selected intervals, or when a desired amount of data has been captured, the monitoring system may than analyze the captured traffic in a batch mode to determine whether any Anti-SoR activity has occurred in a previous period. Both real-time and historical detection of Anti-SoR activity has potential business value to the Home network service provider. The Home network service provider may attempt to counter a Visited network's Anti-SoR activity using technical, commercial, or legal methods. However, any counter-measures taken by the Home network service provider against the Anti-SoR activity would likely take some period of time, such as days or weeks—if not longer, before they were effective.

Estimating Indicator No. 1: Number of Unique Active Roamers

The number of unique successful roamers for a given Visited network can be estimated by the network monitoring system using data passively captured from SS7 links on the Home network. In one embodiment, the monitoring system performs the following process.
1. At the start of each day, reset the value of Indicator No. 1 for a selected Visited network to zero.
2. Track each individual outbound roaming subscriber (SUB) in the Visited network. The subscribers' identity can be determined, for example, using the IMSI or MSISDN of the user equipment.
3. At the end of the day, review the traffic for each SUB. Count a particular SUB as an Active Roamer, and increment the value of Indicator No. 1 for the Visited network on that day, if that SUB performed at least one successful service attempt among the following operations: Mobile Originating Voice Call, Mobile Terminating Voice Call, Mobile Originating SMS, and Mobile Terminating SMS.

Estimating Indicator No 2: Number of Unique Steered Roamers

The number of unique steered roamers for a given Visited network can be estimated by the monitoring system using the following process.
1. At the start of each day, reset the value of Indicator No. 2 for a selected Visited network to zero.
2. Track each individual outbound roaming subscriber (SUB) in the Visited network. The subscribers' identity can be determined, for example, using the IMSI/MSISDN of the user equipment.
3. At the end of that day, review the traffic for each SUB. Count a particular SUB as a Steered Roamer, and increment the value of Indicator No. 2 for the Visited network on that day, if both of the following conditions have been met:
   a) that SUB performed no successful MAP Update Location transactions from the Visited network; and
   b) all failed MAP Update Location transactions from that SUB were rejected with a Response Code identified in a predetermined list. The Response Code list may be configurable and, in an exemplary or default embodiment, includes the codes: System Failure, Roaming Not Allowed, Data Missing, and Unexpected Data Value. The Response Code list may be configured differently for each Visited network.

Indicator No. 2 may not provide a precise count of the Steered Roamers, because the Response Codes used by the Steering platform to steer roaming subscribers to different Visited networks may also be used by the Home network itself to report real network or subscription problems. However, the value of Indicator No. 2 does provide relevant information will play a role in the heuristic detection of Anti-SoR activity.

Estimating Indicator No. 3: Number of Unique Anti-Steered Roamers

The number of unique Anti-Steered Roamers for a given Visited network may be estimated by the monitoring system using the following process.
1. At the start of each day, reset the value of Indicator No. 3 for a selected Visited network to zero.
2. Track each individual outbound roaming subscriber (SUB) in the Visited network. The subscribers' identity can be determined, for example, using the IMSI/MSISDN of the user equipment.
3. At the end of that day, review the traffic for each SUB. Count a particular SUB as an Anti-Steered Roamer and increment the value of Indicator No. 3 for the Visited network on that day if at least one of the following conditions has been met:
   a) That particular SUB performed at least one sequence of n MAP Update Location transactions from the Visited network in a period of $t_1$ seconds, wherein the first n−1 transactions failed with a Response Code and the last transaction was successful. The values of $t_1$ and/or n may be configurable. The Response Code may be any MAP Response Code in a predetermined or configurable list. In an exemplary embodiment, the default value of $t_1$ is 20 seconds, the value of n is 5, and the Response Code configurable list includes the codes: System Failure, Roaming Not Allowed, Data Missing, and Unexpected Data Value. The MAP Response Code may be configured differently on each Visited network.
   b) That particular SUB performed at least one sequence of n MAP Update Location transactions from the Visited network, wherein the MAP Update Location attempts are spaced a minimum $t_2$ seconds and a maximum $t_3$ seconds apart, and wherein the first n−1 transactions failed with a Response Code RC and the last transaction was successful. The values of $t_2$, $t_3$ and n may be configurable. In an exemplary embodiment, the default value of $t_2$ is 35 seconds, the default value of $t_3$ is 40 seconds, and the default value of n is 5. The Response Code may be any MAP Response Code in a predetermined or configurable list. In an exemplary embodiment, the Response Code configurable list includes the codes: System Failure, Roaming Not Allowed, Data Missing, and Unexpected Data Value.
   c) That particular SUB performed at least m sequences of MAP procedures in a period of 1 hour, wherein each sequence starts with a MAP Cancel Location to the Visited network and terminates with a MAP Update Location from the Visited network. The MAP procedures included in each sequence and the time interval between subsequent procedures in the sequence may be configurable. In one embodiment, a default configuration will be a sequence comprising MAP Cancel Location and MAP Update Location transactions that are spaced less than 20 seconds apart. The value of m may be configurable. A default value of m=2 is used in one embodiment.

Indicator No. 3 may not provide a precise count of the Anti-Steered Roamers, because the subscriber or user equipment—and not a not an Anti-SoR platform—may have manually forced the selection of the network, which could include a sequence of MAP procedures that is counted under Indicator No. 3. Additionally, Anti-SoR behavior may include variations in terms of timing and signaling flow, which could potentially elude detection using the process described above. However, the value of Indicator No. 2 does provide relevant information will play a role in the heuristic detection of Anti-SoR activity.

Estimating Indicator No. 4: Potential Aliasing of the Home Network HLR

An Anti-Steering platform may respond to the Visited network using the address of the Home network's HLR. If this happens, the monitoring system will report a Response-only MAP Transaction. The value of Indicator No. 4 counts the number of Response-only Transactions. The list of Response-only Transactions used to calculate Indicator No. 4 may be configurable and, in one embodiment, may default to Update Location/Insert Subscriber Data.

Generating Warnings on the Possible Presence of Anti-Steering of Roaming

Based on the values of Indicators Nos. 1-4, the monitoring system will generate warnings if an indication of possible Anti-Steering of Roaming is detected.

Near real-time warnings may be generated by the monitoring system based on the rule 3 of the Indicator No. 3 process described above. If processing power in the monitoring system is sufficient, the system can continuously evaluate this rule and generate warnings when one SUB matches either the first or the second condition of rule 3.

Near real-time warnings may also be generated by the monitoring system using Indicator No. 4. If the value of Indicator No. 4 reaches a configurable or preset threshold within a configurable or preset time interval, then the monitoring signal may determine that the Visited network is using Anti-SoR.

In one embodiment, the monitoring system may generate Anti-SoR reports using a combination of the Indicators, such as with the following approach.

| | |
|---|---|
| IF | (Indicator No. 2 / (Indicator No. 1 + Indicator No. 2)) < X |
| AND | (Indicator No. 3 / Indicator No. 2) > Y |
| THEN | Report Anti-SoR activity |

The first expression (Indicator No. 2/(Indicator No. 1+Indicator No. 2)) measures the efficiency of steering by the Home network as a fraction of the total number of roaming subscribers that have been steered.

The second expression (Indicator1/Indicator2) measures the effect of Anti-SoR against the effect of Steering.

The values of X and Y are configurable and may be selected independently for each Visited network. X and Y may depend on the configuration of the Steering platform for the Home network and on the required percentage of steered subscribers. A calibration period may be used to select the values of X and Y.

Indicator No. 1 and Indicator No. 2 can only be estimated with a heuristic approach, which makes confirmation of possible Anti-SoR necessary. Such further confirmation may be necessary before the Home network operator takes legal or commercial actions.

Confirmation of Anti-SoR can be obtained with test mobiles. For example, test mobile 112 may be placed in the coverage area for one or more of VPMN 102-104. Home network 105 or monitoring system 111 are in communication with test mobile 112 via link 113, which may be SS7 signaling, an Internet connection, or any other communication method. Home network 105 or monitoring system 111 may direct the test mobile 112 to attach to a selected Visited network, such as VPMN 104. When attachment messages are sent from VPMN 104 to Home network 105, the steering platform 108 rejects the Update Location message in an attempt to steer test mobile 112 to another VPMN. If VPMN 104 is employing Anti-SoR, then it will not notify test mobile 112 that the Update Location message was rejected. Since Home network 105 and/or monitoring system 111 have a back channel 113 connection to test mobile 112, they can monitor what messages are actually sent and received by test mobile 112. The actual messages can be compared to expected messages that should have been sent or received based upon Home network 105's instructions. If the actual messages do not match the expected messages, such as when an Update Location or Cancel Location message is not transmitted as expected, then Anti-SoR activity can be confirmed.

Generating a Detailed Protocol Trace to Confirm What Detected

The monitoring system has the capability to log call captured MAP signaling traffic as data records and to generated full protocol traces. When the monitoring system's Anti-SoR detection process generates warnings, it will also provide a list of detected IMSI/MSISDN identities of the subscribers. This list can be used in a protocol trace query tool and in a historical call trace application. Detailed protocol traces can be generated for the user equipment corresponding to the detected IMSI/MSISDN to confirm whether Anti-SoR occurred as suggested by the Indicators.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method for detecting anti-steering of roaming on a visited network, comprising:
   capturing signaling messages received at a home network from roaming subscribers on the visited network;
   correlating the captured messages on a per-subscriber basis;
   estimating a number of active roaming subscribers on the visited network;
   estimating a number of steered roaming subscribers on the visited network;
   estimating a number of anti-steered roaming subscribers on the visited network;
   comparing the estimated numbers of active roaming subscribers, steered roaming subscribers, and anti-steered roaming subscribers alone or in combination to one or more preselected thresholds; and
   identifying potential anti-steering of roaming activity if one or more of the estimated numbers alone or in combination exceed a preselected threshold.

2. The method of claim 1, further comprising:
   counting a particular network subscriber as an active roaming subscriber if the particular subscriber successfully initiated or received a communication on the visited network.

3. The method of claim 2, wherein the communication on the visited network comprises a communication selected from the group consisting of: a voice call, a data connection, and a short message service communication.

4. The method of claim 1, further comprising:
   counting a particular subscriber as a steered roaming subscriber if the home network did not perform any successful update location transactions from the visited network for the particular subscriber.

5. The method of claim 4, wherein the particular subscriber is counted as a steered roaming subscriber if a group of failed update location transactions were rejected with a response code selected from the group consisting of: System Failure, Roaming Not Allowed, Data Missing, and Unexpected Data Value codes.

6. The method of claim 1, further comprising:
   counting a particular network subscriber as an anti-steered roaming subscriber if the particular subscriber performed a sequence of failed update location transactions within a predetermined period of time followed by a successful update location transaction.

7. The method of claim 1, further comprising:
counting a particular network subscriber as an anti-steered roaming subscriber if the particular subscriber performed a sequence of update location transactions wherein each update location transaction is spaced within a predetermined interval and wherein the sequence is followed by a successful update location transaction with the predetermined interval.

8. The method of claim 1, further comprising:
counting a particular network subscriber as an anti-steered roaming subscriber if the particular subscriber performed a plurality of transactions sequences with the visited network within a predetermined period of time, the transaction sequences each comprising an exchange of at least one cancel location message and at least one update location message.

9. The method of claim 1, further comprising:
generating a protocol trace comprising messages associated with at least one anti-steer roaming subscriber.

10. A network monitoring system, comprising:
at least one SS7 interface adapted to capture data traffic from SS7 links, the data traffic comprising messages exchanged between a home network and one or more visited networks;
a memory adapted to store the captured data traffic; and
a processor adapted to:
calculate a number of active roaming subscribers on the visited network;
calculate a number of steered roaming subscribers on the visited network;
calculate a number of anti-steered roaming subscribers on the visited network;
compare the numbers active roaming subscribers, steered roaming subscribers, and anti-steered roaming subscribers to predetermined thresholds; and
determine whether the visited network is employing anti-steering of roaming techniques based upon the comparison.

11. The system of claim 10, wherein the processor is adapted to perform the compare step in near real-time as the data traffic is captured.

12. The system of claim 10, wherein the processor is adapted to perform the compare step at preselected intervals using captured data traffic stored in the memory.

13. The system of claim 12, wherein the preselected intervals correspond to an operator selected period of time.

14. The system of claim 12, wherein the preselected intervals correspond to a predetermined amount of captured data.

15. The system of claim 10, further comprising:
a test mobile unit operating within a service area of the visited network, the test mobile adapted to attach to the visited network when commanded by the monitoring system, and to report message traffic received from the visiting network to the monitoring system.

16. A non-transitory computer-readable storage medium comprising instructions that, upon execution by a processor of a network monitoring system, cause the network monitoring system to:
capture signaling messages received at a home network from a visited network, wherein the signaling messages correspond to attempts by roaming home network subscribers to attach to the visited network;
estimate a number of active roaming subscribers on the visited network;
estimate a number of steered roaming subscribers on the visited network;
estimate a number of anti-steered roaming subscribers on the visited network;
compare the estimated numbers of active roaming subscribers, steered roaming subscribers, and anti-steered roaming subscribers alone or in combination to one or more preselected thresholds; and
identify potential anti-steering of roaming activity if one or more of the estimated numbers alone or in combination exceed a preselected threshold.

17. The non-transitory computer-readable storage medium of claim 16, wherein the instructions, upon execution by the processor, further cause the network monitoring system to:
count a particular network subscriber as an active roaming subscriber if the particular subscriber successfully initiated or received a communication on the visited network, wherein the communication on the visited network comprises a communication selected from the group consisting of: a voice call, a data connection, and a short message service communication.

18. The non-transitory computer-readable storage medium of claim 16, wherein the instructions, upon execution by the processor, further cause the network monitoring system to:
count a particular subscriber as a steered roaming subscriber if the home network did not perform any successful update location transactions from the visited network for the particular subscriber, wherein the particular subscriber is counted as a steered roaming subscriber if a group of failed update location transactions were rejected with a response code selected from the group consisting of: System Failure, Roaming Not Allowed, Data Missing, and Unexpected Data Value codes.

19. The non-transitory computer-readable storage medium of claim 16, wherein the instructions, upon execution by the processor, further cause the network monitoring system to:
count a particular network subscriber as an anti-steered roaming subscriber if the particular subscriber performed a sequence of failed update location transactions within a predetermined period of time followed by a successful update location transaction;
count a particular network subscriber as an anti-steered roaming subscriber if the particular subscriber performed a sequence of update location transactions wherein each update location transaction is spaced within a predetermined interval and wherein the sequence is followed by a successful update location transaction with the predetermined interval; and
count a particular network subscriber as an anti-steered roaming subscriber if the particular subscriber performed a plurality of transactions sequences with the visited network within a predetermined period of time, the transaction sequences each comprising an exchange of at least one cancel location message and at least one update location message.

20. The non-transitory computer-readable storage medium of claim 16, wherein the instructions, upon execution by the processor, further cause the network monitoring system to:
generate a protocol trace comprising messages associated with at least one anti-steer roaming subscriber.

21. A network monitoring system, comprising:
at least one SS7 interface adapted to capture data traffic from SS7 links, the data traffic comprising messages exchanged between a home network and one or more visited networks;
a memory adapted to store the captured data traffic; and
a processor adapted to:

reset a roamer variable to zero at the begin of the predetermined periods, the roamer variable corresponding to a number of successful roamers for a Visited network;

track individual outbound roaming subscribers in the Visited network during the predetermined period;

identify a particular roaming subscriber as an active roamer if that roaming subscriber performed at least one successful service attempt during the predetermined period; and increment the value of roamer variable for each active roamer.

22. The network monitoring system of claim 21, further comprising:

determine a roaming subscriber's identity using the IMSI or MSISDN of the subscriber's user equipment.

23. The network monitoring system of claim 21, wherein the predetermined period is a twenty-four hour period.

24. The network monitoring system of claim 21, wherein the at least one successful service attempt is selected from the group consisting of: originating a mobile voice call, terminating a mobile voice call, originating an SMS message, and terminating an SMS message.

* * * * *